Patented Oct. 6, 1925.

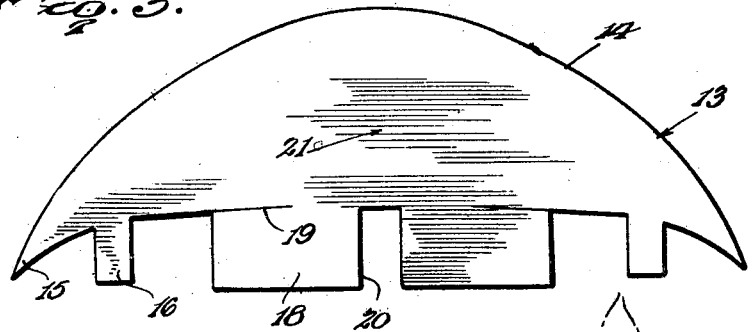
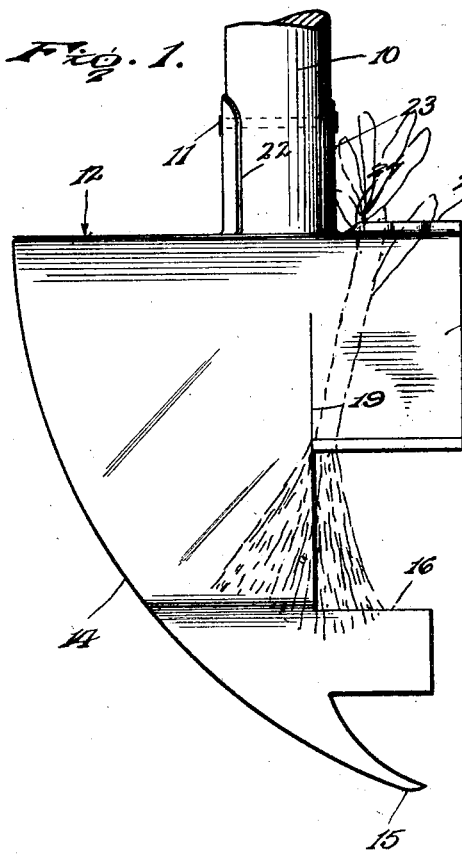
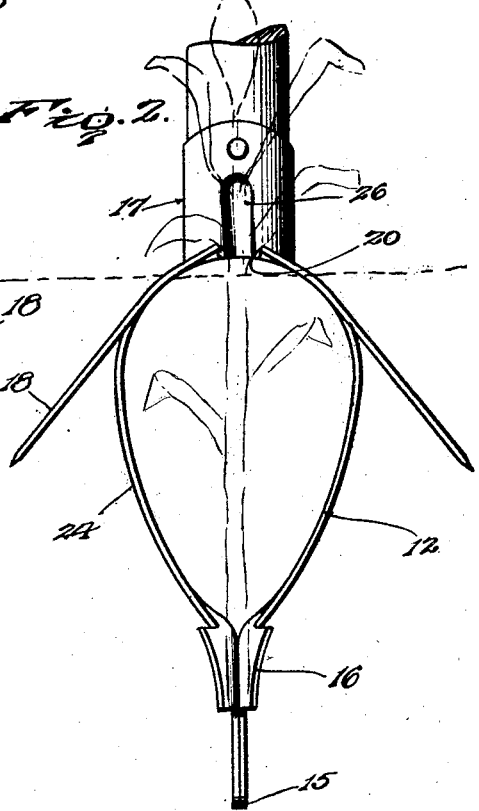

1,556,065

UNITED STATES PATENT OFFICE.

GEORGE J. BECKERMAN, OF CRICHTON, ALABAMA.

PLANT-SETTING IMPLEMENT.

Application filed May 8, 1923. Serial No. 637,530.

*To all whom it may concern:*

Be it known that I, GEORGE J. BECKERMAN, a citizen of the United States, residing at Crichton, in the county of Mobile and State of Alabama, have invented certain new and useful Improvements in Plant-Setting Implements, of which the following is a specification.

My invention relates to an implement used for gardening and more particularly for transplanting vegetables such as cabbage, flowers, tomato plants and the like. It relieves the gardener from bending down when putting the plants in the soil, as the implement not only digs the hole for the plant, but also carries the same during the operation and packs the soil around it after having been positioned. In this manner, the plant is set firmly in the ground, even better than by hand. From practical tests made, the tool has been found most useful.

In the accompanying drawing, one embodiment of the invention has been illustrated; and Figure 1 shows a side elevation of the implement;

Figure 2 is a front elevation thereof; and

Figure 3 is a top plan view of the blank from which the tool is made.

In the drawing, reference numeral 10 represents the handle of the implement which may be made of any suitable length. At the lower end of the handle is rigidly secured, as by rivets 11, the head 12. The blank for this planter is shown in Figure 3 and consists of a crescent shaped plate 13 having the arcuate edge 14 terminating in sharp points 15 at its extremities, and narrow rectangular claws 16 on its basal edge spaced from the points 15. In the middle of the blank is formed a socket 17 for the handle 10. This socket may consist of two arms 22 and 23 slightly spaced apart and welded onto the blank 12. The arm 23 may preferably be provided on its front side with a longitudinally running recess 26, which forms a seat for the neck or stalk of the plant.

A pair of wings 18, substantially rectangular in outline are cut on the basal inner edge of the blank and they are partly separated therefrom by slits 19. Between the wings 18 is formed a recess 20 adapted to accommodate the stem of the plant, and this recess has a bump 27 to keep the plant from slipping out.

This blank 13 is bent or folded upon its transverse medial line 21 so that its central portion arches with its sides converging downwardly to form an inverted pear shaped head 12, when viewed from the end as in Figure 2, the sharp points or spurs 15 coming together at the bottom and the rectangular claws 16 spaced slightly apart or barely contacting. The wings 18 are, however, not bent together but are spread apart in downwardly diverging rotation to form an angle of substantially 90° with each other. In this manner, the width of the tool across the ends of the wings 18 becomes considerably greater than at any other part of the implement.

In using the implement, the stalk or stem of the plant is engaged in the opening or recess 20 and the seat 26 so as to lie close to the handle about where it should come level with the ground, and the lower end or tip of the root is held between the claws 16, the greater portion of the roots spreading into the hollow body portion 12 of the device at the front edges of the same. In this manner, the plant root is held in upright position between the claws 16 and the top of the implement at the recess 20 with the stem or stalk supported by said recess and the seat 26. By pushing the tool into the ground at a slight or no deviation from the vertical, the point 15 and the sharp arcuate edge of the tool will cut into and through the soil and the sides of the cut will be spread apart by the bulky body portion 12, forming a hole to receive the roots. As the downward movement continues, the wings 18 will engage the surface soil and the sides of the opening in the ground to press the same against the roots. After the tool has been pushed down to the required depth, it is moved rearwardly and upwardly in an arcuate path so that it will recede from the plant as it is removed from the ground, this movement leaving the plant in the ground with the soil packed about the roots.

Due to the peculiar shape of the tool, there is no difficulty in pushing the same into the ground, which is previously prepared so as to be softened or loosened as is usually done by plowing or digging.

It will now be clear that the planter using this implement will do the work with much greater ease, than when he has to lean over in the ordinary manner to place the plant in the soil, and this tool will accordingly be a time saver, as a great many more vegetables may be planted when using this implement, than what is the case when planting in the ordinary manner.

Having thus described the invention, what is claimed as new is:

1. A plant-setting implement comprising a handle, and a hollow integral rigid head at the lower end of the handle open at its front and back, said head terminating in a forwardly projecting ground-penetrating point and being provided on its front edges above said point with plant-supporting means.

2. A plant-setting implement comprising a handle, a hollow integral rigid head carried by the handle, said head having downwardly converging side walls terminating at their lower ends in contacting forwardly projecting spurs constituting a ground-penetrating point, means on the front edges of the walls for holding a plant, and soil-packing elements extending beyond the sides of the head at the front thereof.

3. A plant-setting implement comprising a handle, an integral rigid head carried by the handle, said head having an arcuate rear ground-cutting edge and downwardly converging sides terminating in contacting forwardly projecting spurs constituting a ground penetrating point, means on the front and top of the head for supporting the stem and roots of a plant, and fixed soil-packing wings diverging downwardly from the top of the head at the front thereof.

4. A plant-setting implement comprising a handle, a hollow integral rigid head carried by the handle, said head having downwardly converging sides terminating in contacting forwardly projecting spurs constituting a ground-penetrating point and provided with a plant-receiving recess in its top between the side walls, and root-supporting claws on the front of the head above the spurs.

5. A plant-setting implement comprising a handle, a hollow integral rigid head carried by the handle, said head having downwardly converging sides terminating in contacting forwardly projecting spurs constituting a ground-penetrating point, soil-packing wings diverging downwardly from the top of the head on the sides thereof, and root-supporting claws on the front of the head below said wings and over the spurs, the head being provided in its top between said wings with a plant-receiving recess alined with the space between the spurs.

In testimony whereof I affix my signature.

GEORGE J. BECKERMAN. [L. S.]